(12) United States Patent
Kawai et al.

(10) Patent No.: US 7,663,666 B2
(45) Date of Patent: Feb. 16, 2010

(54) OPERATION AT MOBILE TERMINAL WHEN COMMUNICATING WITH REMOTE CAMERA

(75) Inventors: Tomoaki Kawai, Kanagawa (JP); Motoo Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 10/865,854

(22) Filed: Jun. 14, 2004

(65) Prior Publication Data

US 2005/0007459 A1    Jan. 13, 2005

(30) Foreign Application Priority Data

| Jun. 23, 2003 | (JP) | 2003-178613 |
| Jun. 23, 2003 | (JP) | 2003-178614 |
| Jun. 23, 2003 | (JP) | 2003-178615 |

(51) Int. Cl.
*H04N 5/232* (2006.01)

(52) U.S. Cl. .............. 348/211.99; 348/211.3; 348/211.7

(58) Field of Classification Search ......... 348/143–150, 348/211.9–211.7
See application file for complete search history.

(56) References Cited

U.S. PATENT DOCUMENTS

| 6,002,995 | A | 12/1999 | Suzuki et al. | 702/188 |
| 6,067,571 | A | 5/2000 | Igarashi et al. | 709/232 |
| 6,067,624 | A | 5/2000 | Kuno | 713/202 |
| 6,411,275 | B1 | 6/2002 | Hedberg | 345/156 |
| 6,414,716 | B1 | 7/2002 | Kawai | 348/211 |
| 6,545,708 | B1 | 4/2003 | Tamayama et al. | 348/211.8 |
| 2002/0138847 | A1* | 9/2002 | Abrams et al. | 725/105 |
| 2002/0154070 | A1 | 10/2002 | Sato et al. | 345/8 |
| 2002/0167587 | A1 | 11/2002 | Ogasawara | 348/89 |
| 2003/0030731 | A1* | 2/2003 | Colby | 348/231.3 |
| 2003/0093430 | A1 | 5/2003 | Mottur | 707/10 |

FOREIGN PATENT DOCUMENTS

| CN | 1283285 A | 2/2001 |
| CN | 1386016 A | 12/2002 |
| EP | 1 286 529 A1 | 2/2003 |
| JP | 10-40185 | 2/1998 |
| JP | 10-42278 | 2/1998 |
| JP | 11-112617 | 4/1999 |
| JP | 2000-267646 | 9/2000 |
| JP | 2001-033258 | * 2/2001 |
| JP | 2001-136515 | 5/2001 |

(Continued)

OTHER PUBLICATIONS

Adobe Acrobat, 1994, see attached pages, http://www.uoregon.edu/acrobat/guide.pdf.*

*Primary Examiner*—Sinh Tran
*Assistant Examiner*—Anthony J Daniels
(74) *Attorney, Agent, or Firm*—Fitzpatrick, Cella, Harper & Scinto

(57) ABSTRACT

A mobile terminal, which is capable of communicating with a camera server via a network, has a display unit and a plurality of operating units. Operations for acquiring video and for controlling a camera are assigned to respective ones of the plurality of operating units. Depending upon the operation of the plurality of operating units, processing is executed for acquiring video from the camera server or for instructing the camera server to control the camera.

5 Claims, 19 Drawing Sheets

| | FOREIGN PATENT DOCUMENTS | | | | |
|---|---|---|---|---|---|
| JP | 2001-285947 | 10/2001 | | | |
| JP | 2002-057935 | 2/2002 | | | |
| JP | 2002-077033 | 3/2002 | | | |
| JP | 2002-084445 | 3/2002 | | | |
| JP | 2002-094972 | 3/2002 | | | |
| JP | 2002-135867 | 5/2002 | | | |
| JP | 2002-159066 | 5/2002 | | | |
| JP | 2002-197564 | 7/2002 | | | |
| JP | 2003-008701 | 1/2003 | | | |
| JP | 2003008701 A | * | 1/2003 | | |
| JP | 2003-110666 | 4/2003 | | | |
| JP | 2003-115941 | 4/2003 | | | |
| JP | 2003-143578 | 5/2003 | | | |
| JP | 2003-153248 | 5/2003 | | | |
| KR | 2003-0045238 | 11/2003 | | | |
| WO | WO 03/049379 A1 | 6/2003 | | | |

* cited by examiner

FIG. 5A

| KEY | KEY NAME | EXPLANATION |
|---|---|---|
| LEFT-CURSOR | LEFT-PAN | Sets a pan value for when the next camera control request is issued. When the value is input, the field-of-view frame moves to the left. The camera control request is issued by the ENTER key. |
| RIGHT-CURSOR | RIGHT-PAN | Sets a pan value for when the next camera control request is issued. When the value is input, the field-of-view frame moves to the right. The camera control request is issued by the ENTER key. |
| UP-CURSOR | UP-TILT | Sets a tilt value for when the next camera control request is issued. When the value is input, the field-of-view frame moves up. The camera control request is issued by the ENTER key. |
| DOWN-CURSOR | DOWN-TILT | Sets a tilt value for when the next camera control request is issued. When the value is input, the field-of-view frame moves down. The camera control request is issued by the ENTER key. |
| 1 | ZOOM (TELEPHOTO) | Sets a zoom value for when the next camera control request is issued. When the value is input, the field-of-view frame shrinks. The camera control request is issued by the ENTER key. |
| 3 | ZOOM (WIDE ANGLE) | Sets a zoom value for when the next camera control request is issued. When the value is input, the field-of-view frame enlarges. The camera control request is issued by the ENTER key. |

FIG. 5B

| FUNCTION | | |
|---|---|---|
| 6 | BACKLIGHT CORRECTION | Sets a backlight-correction state for when the next camera control request is issued. When the value is input, a backlight correction button changes in accordance with the set value. The camera control request is issued by the ENTER key. |
| 2 | CAMERA/PRESETTING SELECTION (REVERSE) | Selects a specified camera or a presetting for when the next camera control request is issued. When the input is made, a display item in a camera/presetting list changes in the reverse direction. The camera control request is issued by the ENTER key. |
| 5 | CAMERA/PRESETTING SELECTION (FORWARD) | Selects a specified camera or a presetting for when the next camera control request is issued. When the input is made, a display item in a camera/presetting list changes in the forward direction. The camera control request is issued by the ENTER key. |
| | ENTER | Initiates and terminates access and requests camera control. Content to be executed changes at entry depending upon the state of control privilege or the display item in the camera/preset list. |
| 7 | IMAGE SCROLL (COUNTER-CLOCKWISE) | Changes the displayed part of the image received from the camera server. When the input is made, the part displayed changes. |
| 9 | IMAGE SCROLL (CLOCKWISE) | Same as above |
| 8 | IMAGE SCROLL (HOME) | Same as above |

F I G. 5C

| SOFT KEY | LABEL | EXPLANATION |
|---|---|---|
| LEFT | QUIT | Ends communication and quits the viewer after a connection termination request is issued. Quits the viewer after session termination processing is executed in response to the connection termination request after the start of a session with the camera server in response to start of access. |
| RIGHT | SFT | Effects a transition to the setting screen of Fig. 7 if pressed when there is no access. |
| | STOP | Ends communication if pressed during access. |

FIG. 7A

```
*Tiil  i  a                    ♀
```

| SETTINGS |
|---|
| ▽ IMAGE ACQUISITION INTERVAL |
| 0 SECONDS |
| ▽ NUMBER OF IMAGE ACQUISITIONS |
| UNLIMITED |
| ▽ ILLUMINATION |
| ON |
| ▽ VIBRATOR |
| OFF |
| SWITCH TO CAMERA CONTROL MODE |
| CAMERA CONTROL : ON |
| SWITCH TO ADMINISTRATOR MODE |
| ADMINISTRATOR MODE : OFF |
| QUIT | | SAVE |

FIG. 7B

```
*Tiil  i  a              ⇕  ♀
```

| SETTINGS |
|---|
| ▽ IMAGE ACQUISITION INTERVAL |
| 0 SECONDS |
| ▽ NUMBER OF IMAGE ACQUISITIONS |
| UNLIMITED |
| ▽ ILLUMINATION |
| ON |
| ▽ VIBRATOR |
| OFF |
| SWITCH TO CAMERA CONTROL MODE |
| CAMERA CONTROL : ON |
| SWITCH TO ADMINISTRATOR MODE |
| ADMINISTRATOR MODE : ON |
| ▽ CONTROL OF EXTERNAL DEVICES |
| EXTERNAL DEVICE 1 |
| EXTERNAL DEVICE 2 |
| 1 : ON   2 : ON |
| ▽ DESIGNATE SET CAMERA |
| Camera1 |
| ▽ DESIGNATE VIDEO SIZE |
| ⦿ UNCHANGED<br>○ 160 × 120<br>○ 320 × 240 |
| |
| ▽ SET VIDEO QUALITY |
| ⦿ UNCHANGED<br>○ LOW<br>○ STANDARD<br>○ HIGH |
| |
| QUIT | | SAVE |

FIG. 8

| COMPONENT | EXPLANATION |
|---|---|
| NORMAL-MODE SETTING FUNCTIONS | |
| "IMAGE ACQUISITION INTERVAL" | Selects and specifies time from completion of image-data acquisition to start of next communication, i.e., the image acquisition interval, from {"10 seconds", "1 second", "2 seconds", "3 seconds", "5 seconds", "10 seconds"}. |
| "NUMBER OF IMAGE ACQUISITIONS" | Selects and specifies maximum number of images acquired from start of communication by ENTER key to automatic halting of image acquisition from {"1 time", "100 times", "unlimited"}. |
| "ILLUMINATION" | Switches between ON and OFF of terminal display backlight. |
| "VIBRATOR" | Specifies timing at which terminal vibrator is actuated. |
| "CAMERA CONTROL MODE" | Switches between control ON and control OFF as camera control mode. |
| "ADMINISTRATOR MODE" | Effects a transition from the normal mode to the administrator mode. The mode is always the normal mode immediately after start-up. |
| ADMINISTRATOR-MODE SETTING FUNCTIONS | |
| "EXTERNAL-DEVICE OUTPUT" | Switches between ON and OFF of external-device output conforming to button. The number of buttons varies depending upon the camera server at the access destination. |
| "CAMERA" | Specifies the camera for which settings of video size and video quality are to be changed. The first usable camera is displayed immediately after a transition is made to the administrator mode. |
| "VIDEO SIZE" | Changes the video size of the camera selected by "CAMERA". |
| "VIDEO QUALITY" | Changes the video quality of the camera specified by "CAMERA". |

FIG. 11

| DISPLAY | STATUS | EXPLANATION |
|---|---|---|
|  | WHEN CONTROL PRIVILEGE HAS NOT BEEN ACQUIRED | A state in which control privilege is not currently in possession and acquisition thereof is not being requested, or a state in which control privilege is not being awaited following request of acquisition thereof. |
| 59:56 | WAITING FOR CONTROL PRIVILEGE | A state in which acquisition of control privilege has been requested but is already in possession of another client. The displayed time represents control waiting time. Control waiting time is displayed up to 00:01. When 00:00 is attained, display of control waiting time vanishes. |
| 59:56 | CONTROL PRIVILEGE NOW IN POSSESSION | A state in which control privilege is in possession. The displayed time represents the control time remaining. The control time remaining is displayed up to 00:01. When 00:00 is attained, possession of control privilege is extended. |
|  | POSSESSION OF CONTROL PRIVILEGE CURRENTLY BEING EXTENDED | A state in which the control privilege can be kept even after elapse of the remaining control time when another client has not begun waiting for possession of control privilege. |

FIG. 12

| DISPLAY | STATUS | EXPLANATION |
|---|---|---|
|  | NOT CONNECTED | A state in which access to the camera server has not started or a state in which access has been terminated. |
| 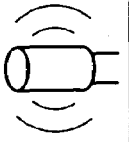 | COMMUNICATION IN PROGRESS | A state in which data is being sent to and received from the camera server. |
|  | WAITING FOR COMMUNICATION | A state in which sending of data to and receiving of data from the camera server is being awaited. |

FIG. 14

| COMPONENT | EXPLANATION |
|---|---|
| IMAGE WINDOW | Displays an image from the camera server and a camera position frame. A partial image is displayed if the image will not fit within the image window. |
| VISIBLE RANGE FRAME | Displays the full area capable of being captured by the present camera, i.e., the visible area, as a rectangle on the image in superimposed form. Displayed as a white rectangle. |
| MOVABLE RANGE FRAME | Represented as a rectangle in which the range over which the center of the present camera lens can be moved, i.e., the full range of movement, constitutes a relative value with respect to the visible range frame. Displayed as a white rectangle. |
| FIELD-OF-VIEW SETTING FRAME | Represented as a rectangle in which pan, tilt and zoom values to be controlled serve as relative values with respect to the visible range frame. Includes selection of a presetting list. Serves as a guide for position and for zoom magnification. Displayed as a yellow rectangle. If the ENTER button is pressed to finalize, the frame is displayed in red. When an image is displayed, this frame is replaced by the field-of-view frame displayed in the color green. |
| FIELD-OF-VIEW FRAME | Displayed as a rectangle in which pan, tilt and zoom values corresponding to the image presently being displayed serve as relative values with respect to the visible range frame. Displayed in the color green. |
| CAMERA/PRESETTING LIST | "CONTROL OFF" or camera or presetting is displayed. |
| BACKLIGHT CORRECTION BUTTON | Represents ON/OFF setting value of backlight correction. Display changes depending upon status of control privilege and set value of backlight correction. |
| INFORMATION DISPLAY BAR | Displays various information as a character string. |
| COMMUNICATION-STATE DISPLAY | Displays state of communication. |
| IMAGE SCROLL INDICATOR | Displayed if received image will not fit in image window. Represents relative position, with respect to entire received image, of a partial image currently being displayed in the image window. |
| CONTROL STATUS PANEL | Displays control-privilege acquisition state and control waiting / remaining control time. |

F I G. 15

| ITEM | EXPLANATION |
|---|---|
| OFF | Vibrator is never actuated. |
| WHEN IMAGE ACQUISITION IS COMPLETED | Vibrator is actuated when a received image is displayed. |
| WHEN CONTROL PRIVILEGE IS ACQUIRED | Vibrator is actuated when control privilege has been acquired. |
| WHEN CAMERA CONTROL IS COMPLETED | Vibrator is actuated immediately after successful control of the camera. |
| WHEN ERROR OCCURS | Vibrator is actuated immediately after occurrence of an error. |

OPERATION AT MOBILE TERMINAL WHEN COMMUNICATING WITH REMOTE CAMERA

FIELD OF THE INVENTION

This invention relates to a technique for controlling a remote camera while video from the remote camera is viewed using a mobile terminal such as a mobile telephone.

BACKGROUND OF THE INVENTION

A system available in the art enables video from a camera disposed at a remote location to be observed by a number of people at a number of locations via a network. For example, there is a system in which a computer-controllable camera is connected to a personal computer that has been connected to the Internet, and not only is real-time video captured by the camera distributed to accessing individuals but these individuals are also allowed to control the camera through a WWW (World-Wide Web) server on the Internet (e.g., see the specification of Japanese Patent Application Laid-Open No. 10-040185). The side that distributes the video and the side that observes it are in a server-client relationship. In the description that follows, the apparatus or system on the server side that includes the camera shall be referred to as a "camera server" and the client shall be referred to as an "operating terminal".

A problem relating to camera control arises between the camera server and operating terminals when camera control operations such as pan, tilt and zoom are allowed from a plurality of operating terminals simultaneously. Accordingly, it has been so arranged that the camera control privilege is granted to one operating terminal, camera control is allowed only from the operating terminal having the control privilege, the control privilege is invalidated upon elapse of a fixed period of time and the control privilege is granted to another operating terminal, whereby this other operating terminal is allowed to control the camera (e.g., see the specification of Japanese Patent Application Laid-Open No. 10-042278).

Owing to the growing popularity of mobile telephones and advances in technology in recent years, mobile telephones are now equipped with a WWW browser function, and functions that make it possible to view web pages by accessing the Internet are being introduced. In addition, it is being arranged so that JAVA (registered trademark) and other programs can be downloaded to a mobile telephone via the Internet and run on the mobile telephone.

However, the state of the art is such that with a mobile telephone, it is possible to view only a still-picture page provided by a camera server as a web page. In this case the user must actively perform an operation to update the video. Heretofore a personal computer or its equivalent having a large image display area and a large number of operating keys has been used as an operating terminal capable of controlling a camera while video from the camera server is observed as a real-time moving picture. It is not possible to acquire a moving picture and control a camera by an operation similar to that of a personal computer or the like using an existing mobile terminal having a small display screen and only a limited number of operating keys.

SUMMARY OF THE INVENTION

The present invention has been made in consideration of the above circumstances and its object is to enhance operability at a mobile terminal for performing an operation to acquire a moving picture from a camera server and for performing camera control by communicating with the camera server.

According to the present invention, the foregoing object is attained by providing a storage medium, which is capable of being read by an information processing apparatus, storing a program executed in a mobile terminal for the purpose of controlling the mobile terminal, which is capable of communicating with a camera server via a network and has a display unit and a plurality of operating units, the storage medium comprising: first program code means for assigning operations for video acquisition and camera control to respective ones of the plurality of operating units; and second program code means for executing processing for video acquisition from the camera server or for camera control with respect to the camera server in accordance with operation of the plurality of operating units.

According to the present invention, the foregoing object is also attained by providing a mobile terminal capable of communicating with a camera server via a network, comprising: a display unit; a plurality of operating units; and a control unit that downloads a program for video acquisition and camera control from the camera server, assigns operations for video acquisition and camera control to respective ones of the plurality of operating units based upon the program, and executes processing for video acquisition from the camera server or for camera control with respect to the camera server in accordance with operation of the plurality of operating units.

According to the present invention, the foregoing object is also attained by providing a storage medium, which is capable of being read by an information processing apparatus, storing a program executed in a mobile terminal for the purpose of controlling the mobile terminal, which is capable of communicating with a camera server via a network and has a display unit that displays video from the camera server and a plurality of operating units, the storage medium having program code means which, if video from the camera server has a size greater than screen size of the display unit, performs control so as to scroll the screen of the display unit in accordance with an operation input based upon at least one of the plurality of operating units.

According to the present invention, the foregoing object is also attained by providing a mobile terminal capable of communicating with a camera server via a network, comprising: a display unit that displays an image from the camera server; a plurality of operating units; and a control unit which, if video from the camera server has a size greater than screen size of the display unit, performs control so as to scroll the screen of the display unit in accordance with an operation input based upon at least one of the plurality of operating units.

According to the present invention, the foregoing object is also attained by providing an image distribution system comprising a camera server that distributes video captured by a camera, and a mobile terminal capable of communicating with the camera server via a network, wherein the mobile terminal includes: a display unit that displays an image from the camera server; a plurality of operating units; and a control unit which, if an image from the camera server has a size greater than screen size of the display unit, performs control so as to scroll the screen of the display unit in accordance with an operation input based upon at least one of the plurality of operating units.

According to the present invention, the foregoing object is also attained by providing a storage medium, which is capable of being read by an information processing apparatus, storing a program executed in a mobile terminal for the purpose of controlling the mobile terminal, which is capable of communicating with a camera server via a network and has a display unit and a plurality of operating units, the storage medium comprising: first program code means for obtaining from the camera server video in a visible range area of a camera which is connected to the camera server, and displaying the video on the display unit; second program code means for controlling the camera on the basis of a control condition for the camera input by using the plurality of operating units from the mobile terminal; and third program code means for displaying in the displayed video a frame indicative of an area of the video to be obtained from the camera when the camera is controlled based on the control condition, wherein the frame is displayed in different colors before controlling the camera, during controlling the camera and after controlling the camera.

According to the present invention, the foregoing object is also attained by providing a storage medium, which is capable of being read by an information processing apparatus, storing a program executed in a mobile terminal for the purpose of controlling the mobile terminal, which is capable of communicating with a camera server via a network and has a display unit, a plurality of operating units and a vibrator notifying unit, the storage medium comprising: first program code means for obtaining from the camera server video sensed by a camera connected to the camera server, and displaying the video on the display unit; second program code means for acquiring control privilege from the camera server for controlling the camera in the mobile terminal; third program code means for controlling the camera using the plurality of operating units from the mobile terminal when the control privilege is acquired; and fourth program code means for setting whether or not to perform notification by the vibrator notifying unit at least when the video is displayed, when the control privilege is acquired, when control is completed, or when an error occurs.

According to the present invention, the foregoing object is also attained by providing a mobile terminal capable of communicating with a camera server via a network, comprising: a display unit; a plurality of operating units; a control unit that controls a camera connected to the camera server on the basis of the a control condition input by using the plurality of operating units; and a display control unit that obtains from the camera server video in a visible range area of the camera, displays the video on the display unit, and displays in the displayed video a frame indicative of an area of the video to be obtained from the camera when the camera is controlled based on the control condition, wherein the frame is displayed in different colors before controlling the camera, during controlling the camera and after controlling the camera.

According to the present invention, the foregoing object is also attained by providing a mobile terminal capable of communicating with a camera server via a network, comprising: a display unit; a plurality of operating units; a vibrator notifying unit; a display control unit that obtains from the camera server video sensed by a camera connected to the camera server, and displays the video on the display unit; a control privilege acquisition unit that is used for acquire control privilege from the camera server for controlling the camera; a control unit that is used for controlling the camera on the basis of the operation of the plurality of operating units when the control privilege is acquired; and a setting unit that sets whether or not to perform notification by the vibrator notifying unit at least when the video is displayed, when the control privilege is acquired, when control is completed, or when an error occurs.

According to the present invention, the foregoing object is also attained by providing a storage medium, which is capable of being read by an information processing apparatus, storing a program executed in a mobile terminal for the purpose of controlling the mobile terminal, which is capable of communicating with a camera server via a network and has a display unit and a plurality of operating units, the storage medium comprising: first program code means for obtaining from the camera server video sensed by a camera connected to the camera server, and displaying the video on the display unit; and second program code means for setting a number of times the video is obtained in the mobile terminal using the plurality of operating units.

According to the present invention, the foregoing object is also attained by providing a storage medium, which is capable of being read by an information processing apparatus, storing a program executed in a mobile terminal for the purpose of controlling the mobile terminal, which is capable of communicating with a camera server via a network and has a display unit which displays video sensed by a camera connected to the camera server and a plurality of operating units, the storage medium comprising: first program code means for changing between a first control mode in which control of predetermined operation of the camera server is restricted and a second control mode in which the control of the predetermined operation is not restricted; and second program code means for controlling the camera server using the plurality of operating units in the second control mode.

According to the present invention, the foregoing object is also attained by providing a mobile terminal capable of communicating with a camera server via a network, comprising: a display unit; a plurality of operating units; a display control unit that obtains from the camera server video sensed by a camera connected to the camera server, and displays the video on the display unit; and a control unit that controls a number of times the video is obtained in the mobile terminal on the basis of the operation of the plurality of operating units.

According to the present invention, the foregoing object is also attained by providing a mobile terminal capable of communicating with a camera server via a network, comprising: a display unit; a plurality of operating units; a changeover unit that switches between a first control mode in which control of predetermined operation of the camera server is restricted and a second control mode in which the control of the predetermined operation is not restricted; and a control unit that controls the camera server based on operation of the plurality of operating units in the second control mode.

According to the present invention, the foregoing object is also attained by providing an image distribution system comprising a camera server that distributes video captured by a camera, and a mobile terminal capable of communicating with the camera server via a network, wherein the mobile terminal includes: a display unit; a plurality of operating units; a changeover unit that switches between a first control mode in which control of predetermined operation of the camera server is restricted and a second control mode in which the control of the predetermined operation is not restricted; and a control unit that controls the camera server based on operation of the plurality of operating units in the second control mode, wherein the camera server performs the control of the predetermined operation based on the control by the control unit.

Other features and advantages of the present invention will be apparent from the following description taken in conjunction with the accompanying drawings, in which like reference characters-designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 5A to 5C are diagrams illustrating assignment of keys of the display terminal and operation of the keys in the embodiment of the present invention;

FIGS. 7A and 7B are diagrams illustrating examples of a setting screen according to the embodiment of the present invention;

FIG. 8 is a diagram useful in describing various setting items illustrated in FIGS. 7A and 7B;

FIG. 11 is a diagram illustrating content displayed in accordance with a change in state of control privilege according to the embodiment of the present invention;

FIG. 12 is a diagram illustrating content displayed in accordance with a change in state of connection according to the embodiment of the present invention;

FIG. 14 shows description of displayed items in FIG. 13;

FIG. 15 is a diagram useful in describing the details of vibrator settings;

DETAILED DESCRIPTION OF THE PREFERRED EMBODIMENT

A preferred embodiment of the present invention will be described in detail in accordance with the accompanying drawings. However, the dimensions, shapes and relative positions of the constituent parts shown in the embodiment should be changed as convenient depending on various conditions and on the structure of the apparatus adapted to the invention, and the invention is not limited to the embodiments described herein.

In this embodiment of the present invention, a viewer program for displaying video from a camera and for controlling a camera is downloaded and installed to a mobile telephone, the mobile telephone accesses a camera server using the viewer program and controls the camera while video is being viewed.

Figure 1:
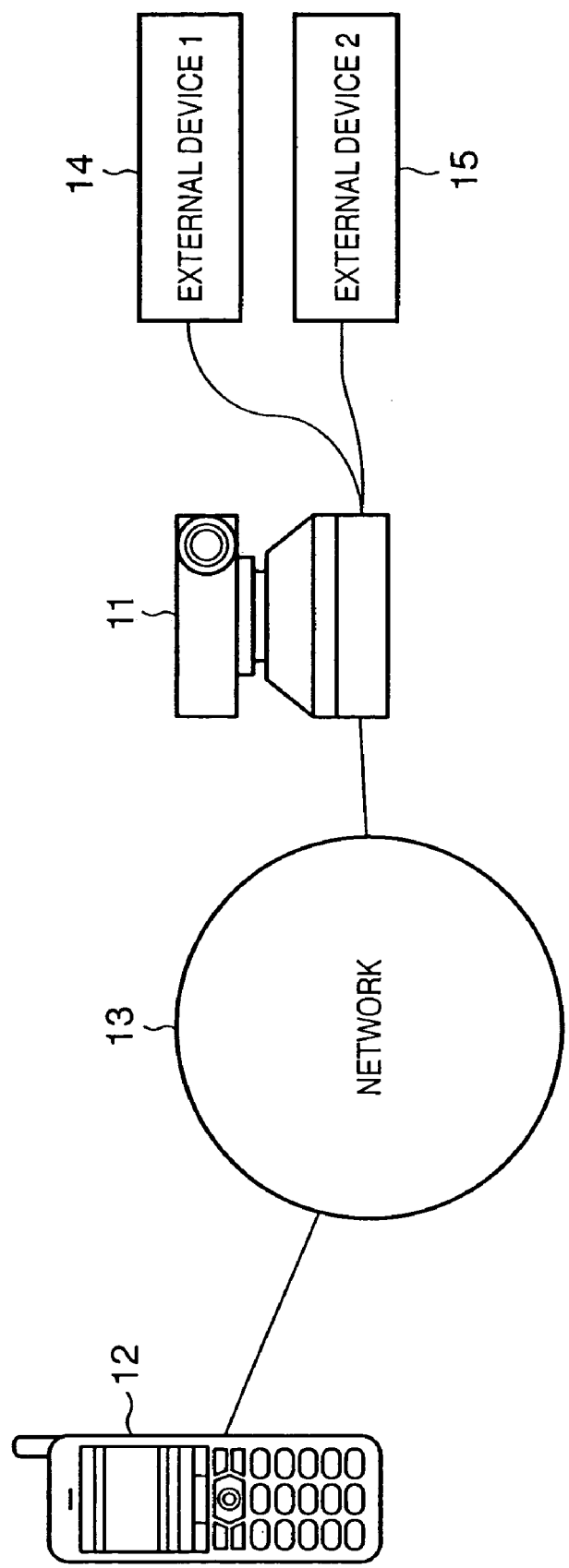
FIG. 1 is a diagram illustrating the configuration of a system according to an embodiment of the present invention.

FIG. 1 is a diagram illustrating the configuration of a system according to an embodiment of the present invention.

As shown in FIG. 1, a camera server 11 and a display terminal 12 are logically connected through a network 13. A mobile telephone is assumed to be the display terminal 12. It is assumed that the display terminal 12 is connected physically through the Internet and an Internet-oriented mobile telephone network provided by a mobile telephone service company (carrier). The camera server 11 accepts a camera control request while distributing real-time video through the network 13 in response to a request from the display terminal 12, thereby making it possible to control the camera from the operating terminal.

Though a plurality of both the camera server 11 and display terminal 12 may be connected to the network 13, FIG. 1 shows that only one of each is connected in order to facilitate the description in this embodiment. Any digital network such as the Internet and intranet having enough bandwidth to pass compressed video data and camera control data may be used as the network 13. It should be noted that the camera server 11 and display terminal 12 have identifiers that can be uniquely identified on the network, and it is assumed that these can be identified by IP addresses. Further, it is assumed that IP addresses have been assigned to the camera server 11 and display terminal 12 in the steady state.

The structures of the camera server 11 and display terminal 12 will now be described in detail.

<Camera Server 11>

The camera server 11 accepts the following requests:
connection start-up request;
video acquisition request;
control-privilege acquisition request;
control-privilege status acquisition request;
camera control request;
camera-information acquisition request;
connection termination request;
camera-video size change request;
video-quality change request; and
external-device control request.

If connection start-up requests from a plurality of users (clients) inclusive of the display terminal 12 are received and video acquisition requests are received, then the camera server 11 loads video from the camera, compresses the video according to the JPEG standard and distributes the compressed video to all of the requesting users.

The camera server 11 is also so adapted as to be capable of controlling zoom magnification of the camera and the pan and tilt angles of the camera panning head in accordance with camera control commands from a plurality of users inclusive of the display terminal 12. However, the camera server 11 does not accept camera control commands from a plurality of users concurrently. First, the camera server 11 accepts a control-privilege acquisition request and permits the camera to be controlled by only one user who has acquired the control privilege. Whether the control privilege has been acquired can be verified on the user side by a control-privilege status acquisition request. If another user is in the process of controlling the camera at the moment the control-privilege acquisition request is received, then the user who issued the control-privilege acquisition request can wait in a queue for the camera control privilege.

The control privilege expires when an upper limit on possession time is reached or when the user having the control privilege abandons the privilege autonomously by issuing a connection termination request, thereby allowing the next user to acquire the control privilege.

Control by specifying pan, tilt and zoom values and by specifying a preset name (the preset name and the pan, tilt and zoom values have been stored in the camera server 11 beforehand in correlated form) is possible as one example of camera control. Further, in a case where a plurality of cameras have been connected to the camera server 11, the camera numbers are registered with the camera server 11 as one example of a presetting, though this is not illustrated in FIG. 1. In a case where only a preset camera number has been selected and not a pan, tilt or zoom value, a camera changeover operation takes effect.

Further, resolution of distributed video (camera video size), change of compressed image quality (video quality) and external devices 14, 15 can be controlled from a user who, in the administrator mode, specifies a password and issues the connection start-up request to gain access. It is assumed that the external devices 14, 15 are devices capable of being controlled by ON/OFF control of contacts.

<Display Terminal 12>

Figure 2:
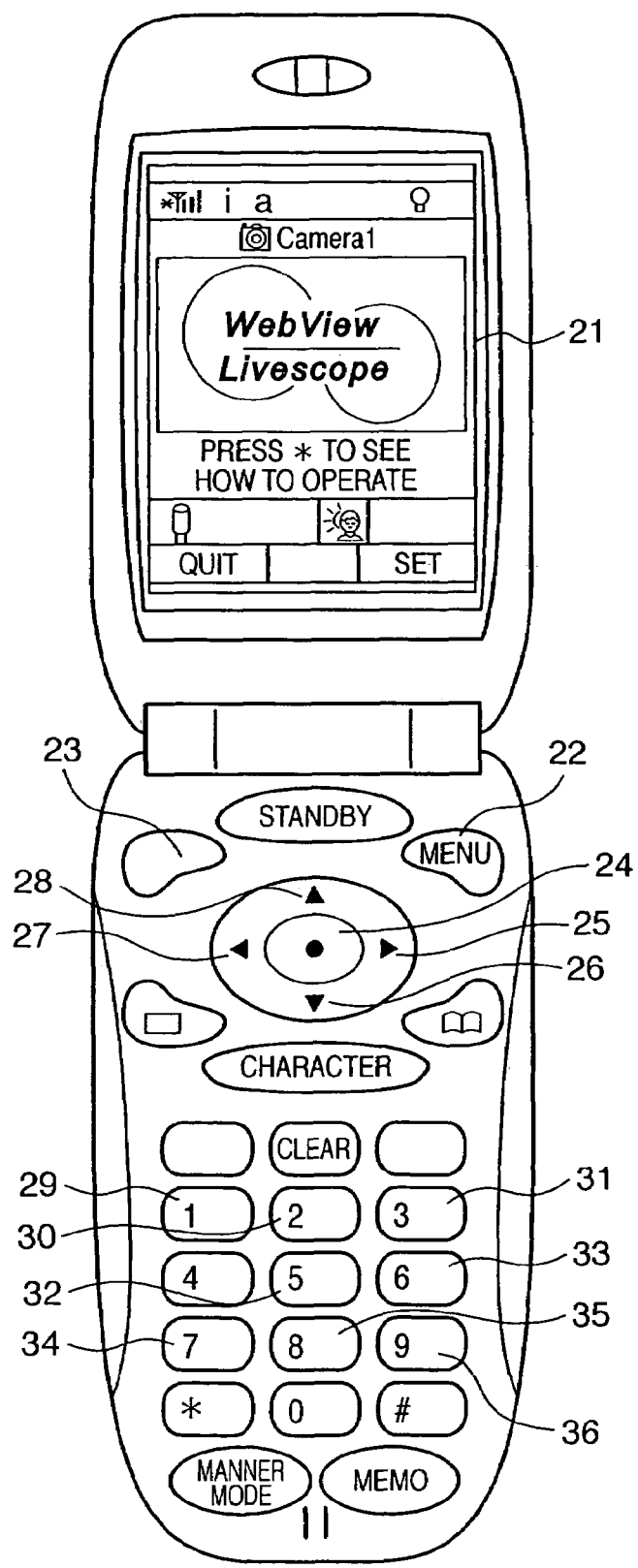
FIG. 2 is an external view of a display terminal according to the embodiment of the present invention.

FIG. 2 is a diagram illustrating an example of the external configuration of the display terminal 12. It is assumed that the display terminal 12 is a mobile telephone terminal run by a downloadable program (referred to as a "downloadable application" below) written in JAVA (registered trademark), such as "i Application" developed by NTT DoCoMo, "EZplus" developed by KDDI, and "BREW (Binary Runtime Environment for Wireless) developed by KDDI.

The above-described requests based upon the HTTP protocol are issued from the display terminal 12 to the camera server 11. Specifically, the protocol is as follows:

http://<IP address>/<type of request>?id=<session number>?param=<control parameter>

The "<IP address>" is the IP address of the camera server 11, the "<type of request>" is a command representing any of the above-mentioned requests, the "<session number>" is a session number that can be uniquely identified on a per-access basis, the "<control parameter>" is an argument necessary for every command, and "?" is a delimiter for connecting a command and a parameter.

The operation of the display terminal 12 described below basically is also the operation of the downloadable application. The downloadable application, which is a video viewer and camera control program (referred to as a "viewer application" below) of the camera server 11, is stored in a memory within the camera server 11 and is downloaded to the display terminal 12 the first time the display terminal 12 accesses to the camera server 11. The downloading of the viewer application in the display terminal 12 and an overview of viewer processing will be described with reference to FIG. 3.

By starting communication and accessing a specific download URL (Uniform Resource Locator) at step S101, the display terminal 12 accesses a page for viewer application download written in HTML and retained in the camera server 11. When the page for viewer application download is accessed, the display terminal 12 displays a screen that allows the user to verify whether the viewer application is to be downloaded. If the viewer application is not to be downloaded, then communication is terminated. If the viewer application is to be downloaded, then control proceeds to step S103 after the viewer application is downloaded from the camera server 11 at step S102.

Figure 4B:
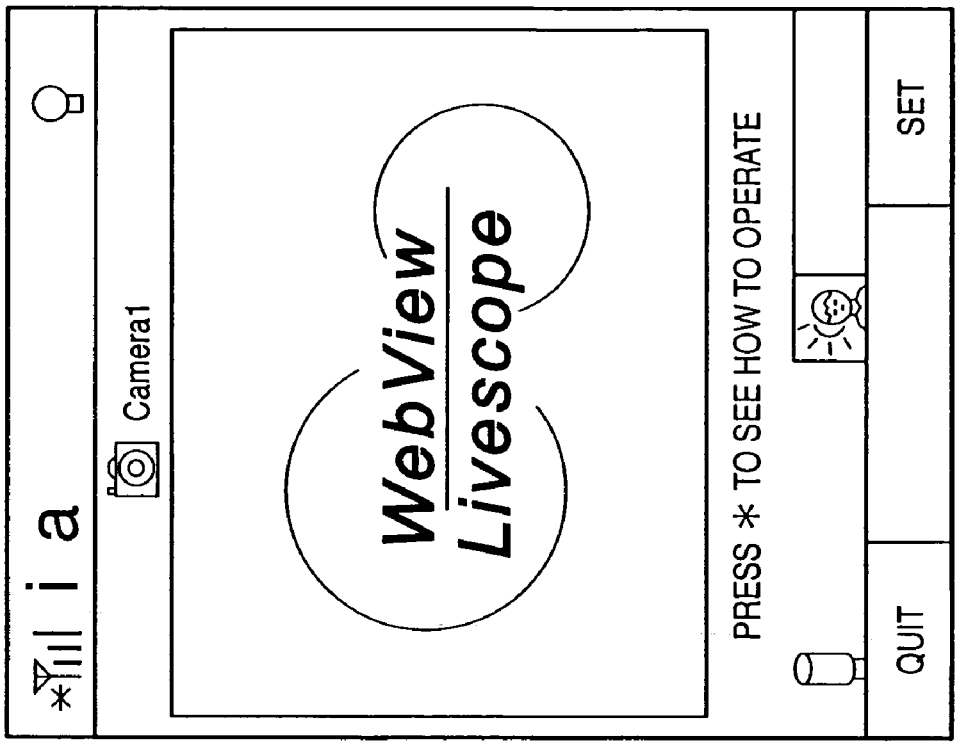
FIGS. 4A and 4B are diagrams illustrating examples of a GUI screen at launch of the viewer application according to the embodiment of the present invention.
Figure 4A:
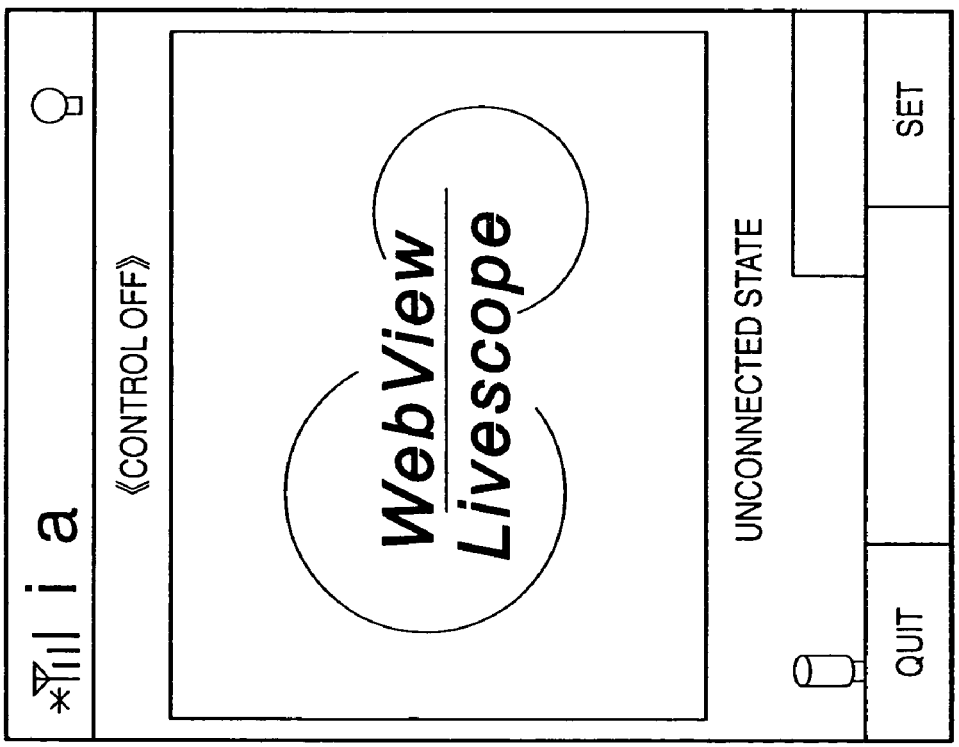

The viewer application is started up at the display terminal 12 at step S103. At this time a GUI (Graphical User Interface) screen of the kind shown in FIG. 4A or 4B is displayed on a display unit 21. The screen of FIG. 4A is displayed if a camera control mode described later has been set to a control-OFF mode, and the screen of FIG. 4B is displayed if the camera control mode has been set to a control-ON mode.

Next, at step S104, numeric and other keys of the display terminal 12 have their settings changed as follows, as illustrated in FIG. 2; a function key operates as an ENTER key 24, a right-cursor key as a right-pan key 25, a down-cursor key as a down-tilt key 26, a left-cursor key as a left-pan key 27, an up-cursor key as an up-tilt key 28, a "1" key as a telephoto zoom key 29, a "2" key as a reverse-direction camera/presetting selection key 30, a "3" key as a wide-angle zoom key 31, a "5" key as a forward-direction camera/presetting selection key 32, a "6" key as a backlight-correction ON/OFF key 33, a "7" key as a counter-clockwise image scroll key 34, an "8" key as an image scrolling home-position designating key 35, and a "9" key as a clockwise image scroll key 36. Further, soft keys are keys for which the operation changes in accordance with the viewer application. These are a quit key 23 and a set/stop key 22. FIGS. 5A to 5C are diagrams illustrating the above-described correspondence and the operation of each key. The above-described key assignment is one example and the invention is not necessarily limited to this assignment.

When the setting of the keys at step S104 has been completed, viewer processing is executed at step S105. The details of viewer processing will be described later. The viewer processing at step S105 continues to be executed until the display terminal 12 quits communication by the connection termination request or in response to some communication error (i.e., until a "YES" decision is rendered at step S106).

Figure 3:
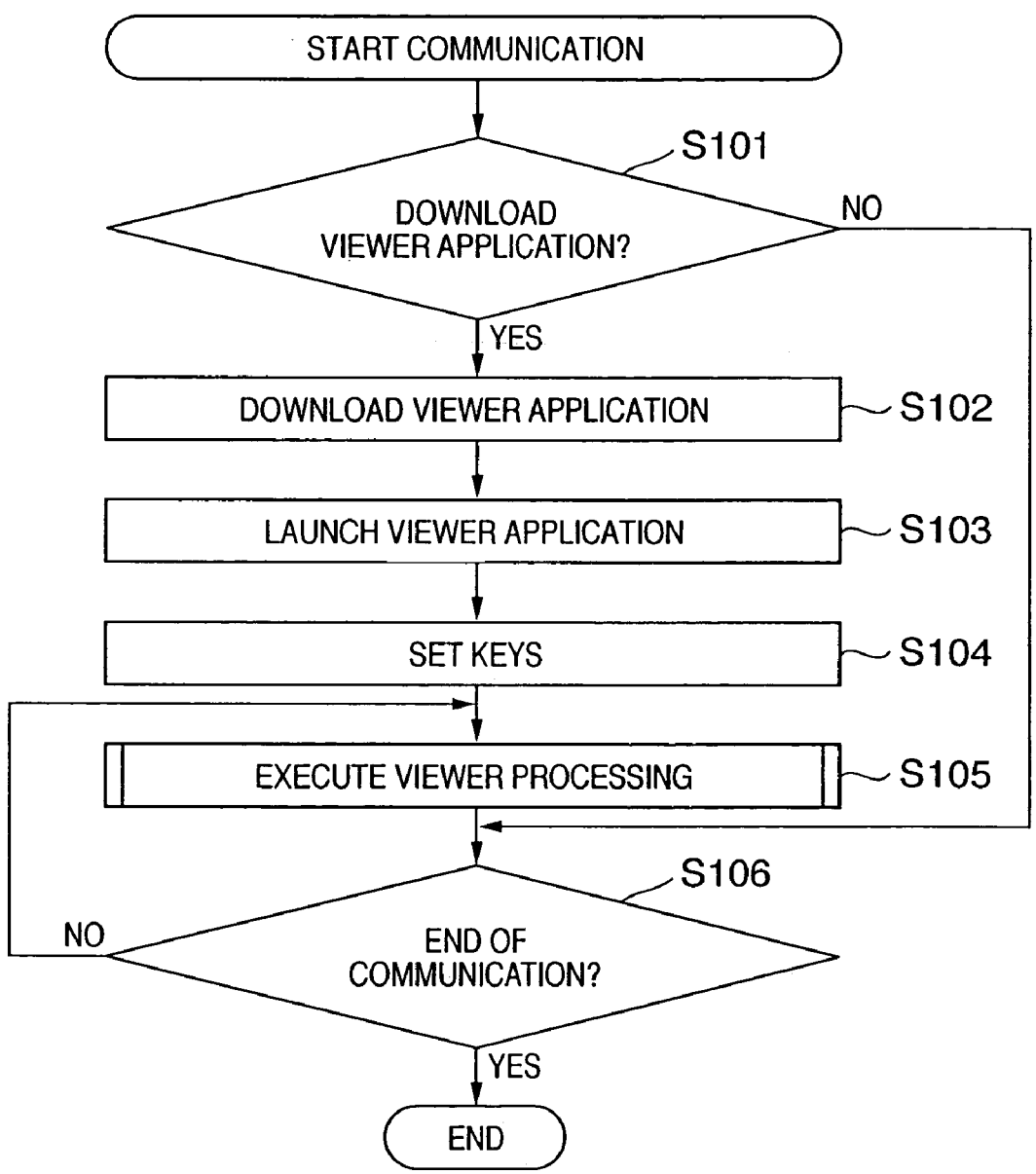
FIG. 3 is a flowchart illustrating downloading of a viewer application at the display terminal device as well as an overview of viewer processing according to the embodiment of the present invention.

The processing shown in FIG. 3 is such that the viewer application is launched after communication starts. However, once the viewer application has been downloaded, the camera server 11 can be communicated with and settings can be changed after first launching the viewer application. Processing in such case will be described with reference to the flowchart of FIG. 6.

First, at step S201, the downloaded viewer application is launched by a prescribed operation. At this time the GUI screen shown in FIG. 4A or 4B is displayed on the display unit 21. The screen of FIG. 4A is displayed if a camera control mode described later has been set to the control-OFF mode, and the screen of FIG. 4B is displayed if the camera control mode has been set to the control-ON mode. It should be noted that after communication has been terminated at step S106 in FIG. 3, the state attained is that which prevails after launch of the viewer application at step S201.

Next, at step S202, it is determined whether the communication with the camera server 11 has been started by sending the connection start-up request to the camera server 11. In a case where communication is initiated, control proceeds to step S203, at which key settings similar to those performed at step S104 in FIG. 3 are made. Viewer processing is executed at step S204 until communication is quit at step S205. When communication ends, control returns to step S202. In a case where a set/stop key 22 has been pressed on the GUI screen of FIG. 4B displayed during viewer processing at step S204, processing similar to that of step S207 described below is executed and the original GUI screen of FIG. 4B is restored by a quit key in FIG. 7A or 7B.

If the set/stop key 22 shown in FIG. 2 has been pressed ("YES" at step S206), then the setting screen of FIG. 7A is displayed on the display unit 21. An explanation of each setting item in FIG. 7A is illustrated in FIG. 8. Various operation settings can be made by using this display screen (step S207). The setting functions include a normal-mode setting function and an administrator-mode setting function. FIG. 7A is a setting screen in the normal mode. This screen is switched over to an administrator screen of the kind shown in FIG. 7B by an administrator-mode changeover button. The user of the display terminal 12 can set the control-OFF mode or control-ON mode using these setting screens. The control-OFF mode is a mode in which camera control is not carried out, whereas the control-ON mode is a mode in which camera control is performed upon issuing the control-privilege acquisition request. If the control mode is changed over in advance, then start-up will be in either mode in accordance with the camera control mode the next time the viewer application is launched. If setting has ended, control returns to step S202. Settings other than those relating to the camera control mode will be described in detail later.

If the quit key 23 has been pressed ("YES" at step S208), the viewer application is quit; otherwise, control returns to step S202.

Figure 9:
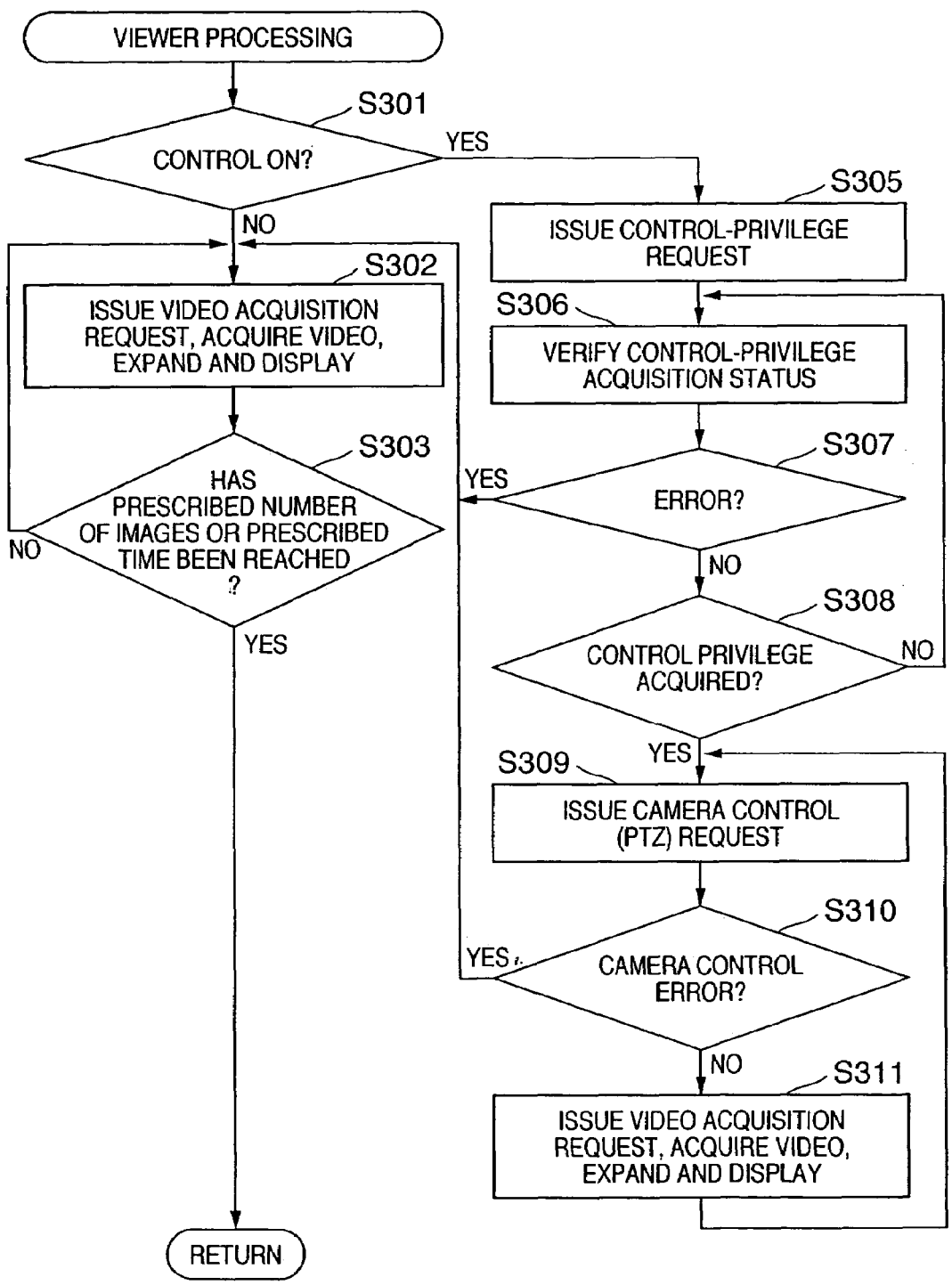
FIG. 9 is a flowchart illustrating viewer processing according to the embodiment of the present invention.
Figure 10:
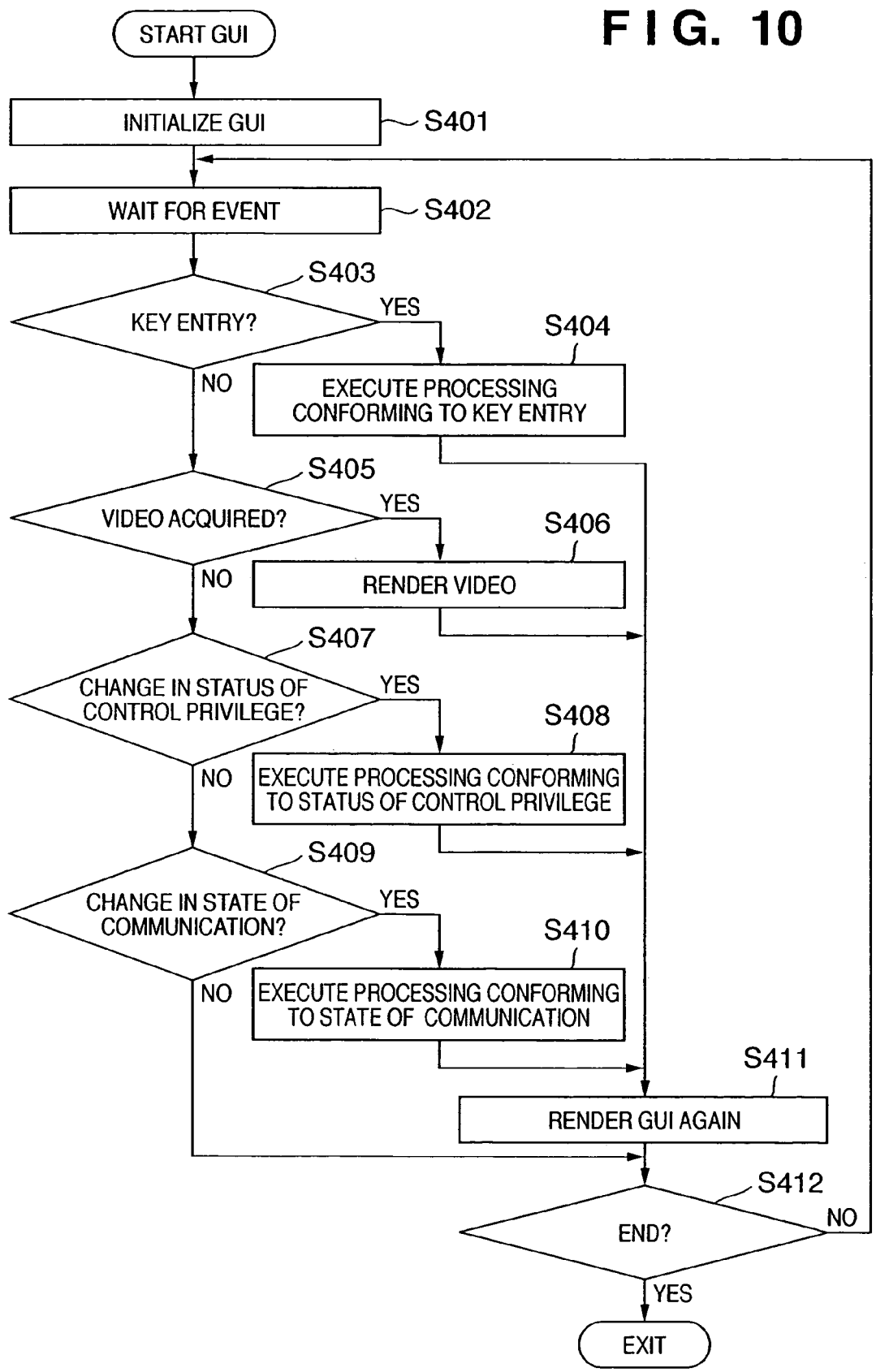
FIG. 10 is a flowchart illustrating processing for changing the GUI screen according to the embodiment of the present invention.

Next, the viewer processing executed at steps S105 and S204 will be described with reference to the flowcharts of FIGS. 9 and 10. In particular, FIG. 9 is a flowchart illustrating an overview of viewer processing, and FIG. 10 is a flowchart illustrating processing for changing the GUI screen in viewer processing. The operations of FIGS. 9 and 10 are performed concurrently.

First, at step S301, it is determined whether the mode is the control-OFF mode or the control-ON mode.

In case of the control-OFF mode ("NO" at step S301), the screen shown in FIG. 4A is displayed on the display unit 21, as mentioned above, the video acquisition request is issued to the camera server 11 at step S302, video that has undergone JPEG decompression is acquired and this is then expanded and displayed. It is determined at step S303 whether a prescribed number of acquisitions has been attained if the number of image acquisitions has been set using the setting screen of FIG. 7A, or whether a prescribed upper limit on connection time has been reached. The processing of step S302 is repeated until a "YES" decision is rendered in either case. When the "YES" decision is obtained at step S303, control returns to step S106 in FIG. 3 or step S205 in FIG. 6.

In case of the control-ON mode ("YES" at step S301), the screen shown in FIG. 4B is displayed on the display unit 21, mentioned above. In order to acquire the camera control privilege, the control-privilege acquisition request is sent to the camera server 11 at step S305. Next, at step S306, the control-privilege acquisition status request is issued to verify whether the camera control privilege could actually be acquired. If a control-privilege acquisition error has occurred ("YES" at step S307), then processing shifts to the control-OFF mode. If there is no error, on the other hand, then it is determined at step S308 whether the control privilege could be acquired. If the control privilege could not be acquired because, e.g., if the acquisition request is waiting in a control-privilege queue, then control returns to step S306. If the control privilege could be acquired, on the other hand, then control proceeds to step S309, where camera control request is issued and the camera is controlled. It is determined at step S310 whether an error has occurred in camera control. A transition is made to the control-OFF mode in case of an error. If there is no error, then control proceeds to step S311, at which the video acquisition request is issued to acquire video. With regard to acquisition of video, operation is similar to that performed at step. S303 in the control-OFF Mode. The operation of steps S309 to S311 is repeated until a prescribed period of time elapses.

If the prescribed period of time elapses and the camera server 11 grants the camera control privilege to another client, then an error is determined with regard to the camera control request at step S310, the control privilege is lost and a transition is made to the control-OFF mode.

Thus, the control-ON mode and control-OFF mode are provided. As a result, if the terminal starts up in the control-OFF mode and the user wishes to view video immediately without having control of the camera, then the user can view the video immediately. Further, if the number of images of video actually acquired by communication reaches the preset number, video acquisition is terminated automatically. This makes it possible to prevent an excessive communication charge from being billed owing to acquisition of more video than necessary.

The processing shown in FIG. 10 for changing the GUI screen is executed from the moment the viewer application is launched to the moment it is quit. If the viewer application is launched at step S103 in FIG. 3 or step S201 in FIG. 6, the GUI is initialized at step S401 and the occurrence of an event is awaited at step S402. Examples of events are a key-entry event for the setting performed at step S207 in FIG. 6, an image acquisition event (steps S302 and S311) when acquisition and expansion of video in the communication operation of FIG. 9 ends, an event when the control privilege is changed (a case where there is change in status at steps S307, S308, S310), and a change in state of communication (steps S106, S205) in a case where the user has clearly terminated the viewer application or where communication has been interrupted owing to the condition of radio waves.

If the entered event is a key entry ("YES" at step S403), processing conforming to the pressed key is executed at step S404 and the GUI is changed at step S411. If a video acquisition request has been issued ("YES" at step S405), then video acquired and expanded at step S406 is displayed on the display unit 21 at step S411. Further, if there has been a change in the status of the control privilege ("YES" at step S407), then processing conforming to the status of the control privilege is executed at step S408 and the GUI is changed at step S411. More specifically, a display of the kind shown in FIG. 11 is presented. It should be noted that since control time remaining is sent back in response to the control-privilege status acquisition request in acquisition of the control privilege, this time also is displayed. Further, in case of a change in state of communication ("YES" at step S409), processing conforming to the state of communication is executed at step S410 and the GUI is changed at step S411. More specifically, display of icons is changed as shown in FIG. 12 in accordance with the state of communication.

After rendering processing or the like has been executed at step S411 in accordance with each of the events, control returns to step S402 and the next event is awaited as long as communication processing does not end (i.e., for as long as a "NO" decision is rendered at step S412).

Figure 13:
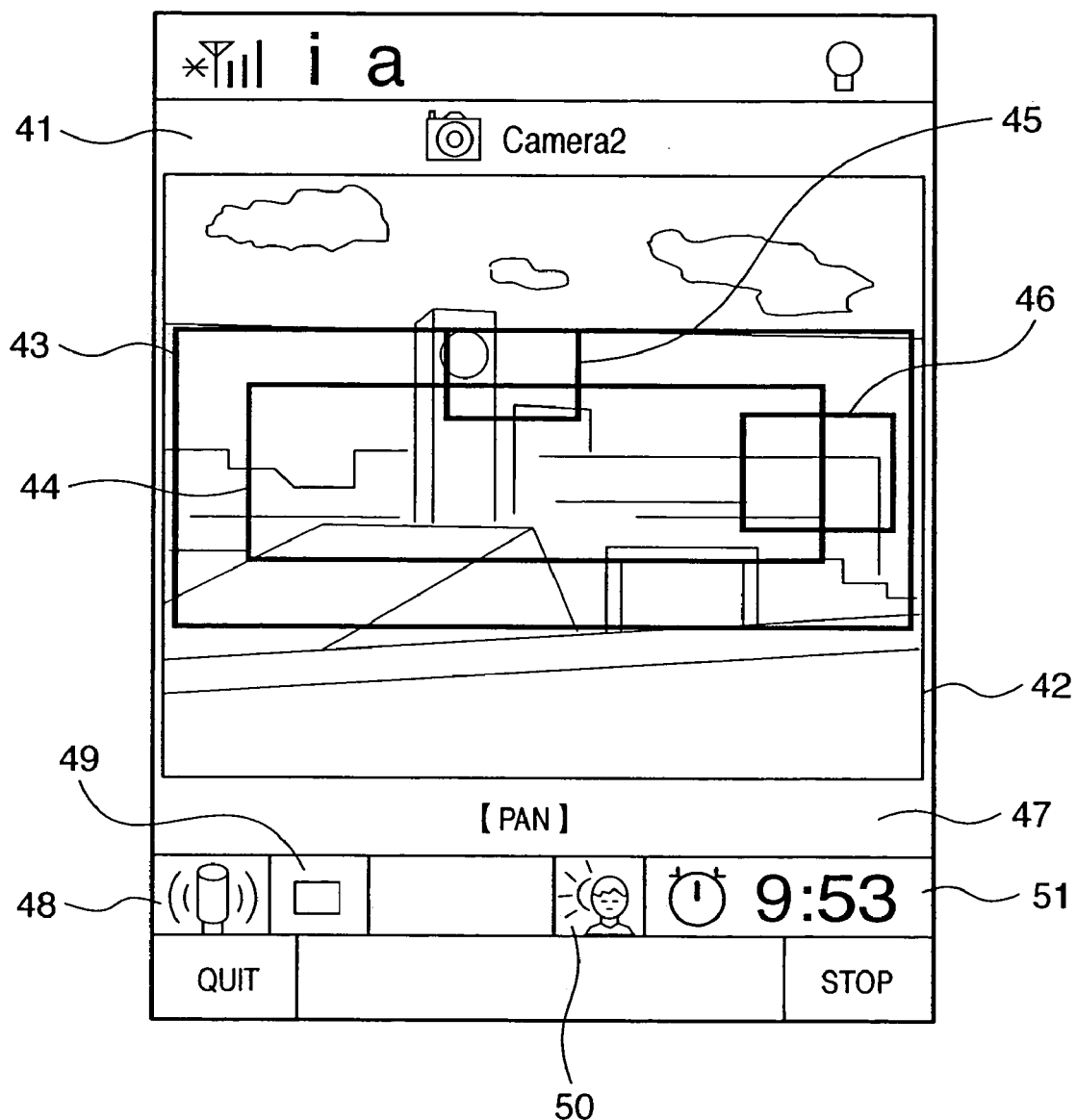
FIG. 13 is a diagram illustrating an example of a screen displayed when control privilege is acquired according to the embodiment of the present invention.

Next, reference will be had to FIG. 13 to describe the GUI screen displayed on the display unit 21 after confirmation of control privilege acquisition at step S308 in FIG. 9.

FIG. 13 is a diagram illustrating an example of a GUI screen displayed on the display unit 21 after confirmation of control privilege acquisition. Shown in FIG. 13 are a camera/presetting list 41, an image window 42, a visible range frame 43, a movable range frame 44, a field-of-view setting frame 45, a field-of-view frame 46, an information display bar 47, a communication status display 48, an image scroll display 49, a backlight-correction status display 50, and a control status panel 51.

The camera control method according to this embodiment will now be described in detail. Since control privilege has already been acquired, operation in a case where the camera of the camera server 11 is in a controllable state will be described.

The field-of-view setting frame 45 represents the pan, tilt and zoom positions, which are about to be controlled, in the form of a rectangle whose position and size are shown relative to the visible range frame 43. This naturally includes a case where control is by selection from a presetting list. The field-of-view setting frame 45 is a guide for position and for zoom magnification about to be controlled and is displayed as, e.g., a yellow-colored rectangle. If the field-of-view setting frame 45 is moved to a desired position and the ENTER key 24 is pressed to finalize the position, then a camera control request is issued. At this time the field-of-view setting frame 45 is displayed in the form of, e.g., a red-colored rectangle. Furthermore, if camera control is executed by the camera server 11 and the corresponding image is acquired and displayed, then the field-of-view setting frame 45 is replaced by the field-of-view frame 46, which is displayed in the form of, e.g., a green-colored rectangle. If image acquisition or control fails, the field-of-view frame 46 is not displayed.

By displaying the control rectangle upon changing its color in accordance with the status of control under circumstances where the frame rate is low, the user can ascertain the status of control easily.

It should be noted that when the image acquired from the camera server 11 is greater than the application screen and will not fit on the display unit 21, the display is changed over by performing scrolling using the scroll keys 33 to 35. This will be described later.

With regard to pan, tilt and zoom control and camera/presetting selection, camera control becomes possible by pressing the ENTER key 24 after the field-of-view setting frame 45 is changed on the GUI by operating the keys 25 to 32. In case of the camera/presetting selection, the field-of-view setting frame 45 corresponding to the presetting is displayed. The field-of-view setting frame 45 is not displayed in case of the camera/presetting selection, where only camera changeover not involving pan, tilt and zoom values is performed.

Further, the communication status display 48 changes depending upon the state of communication, as shown in FIG. 12.

Figure 6:
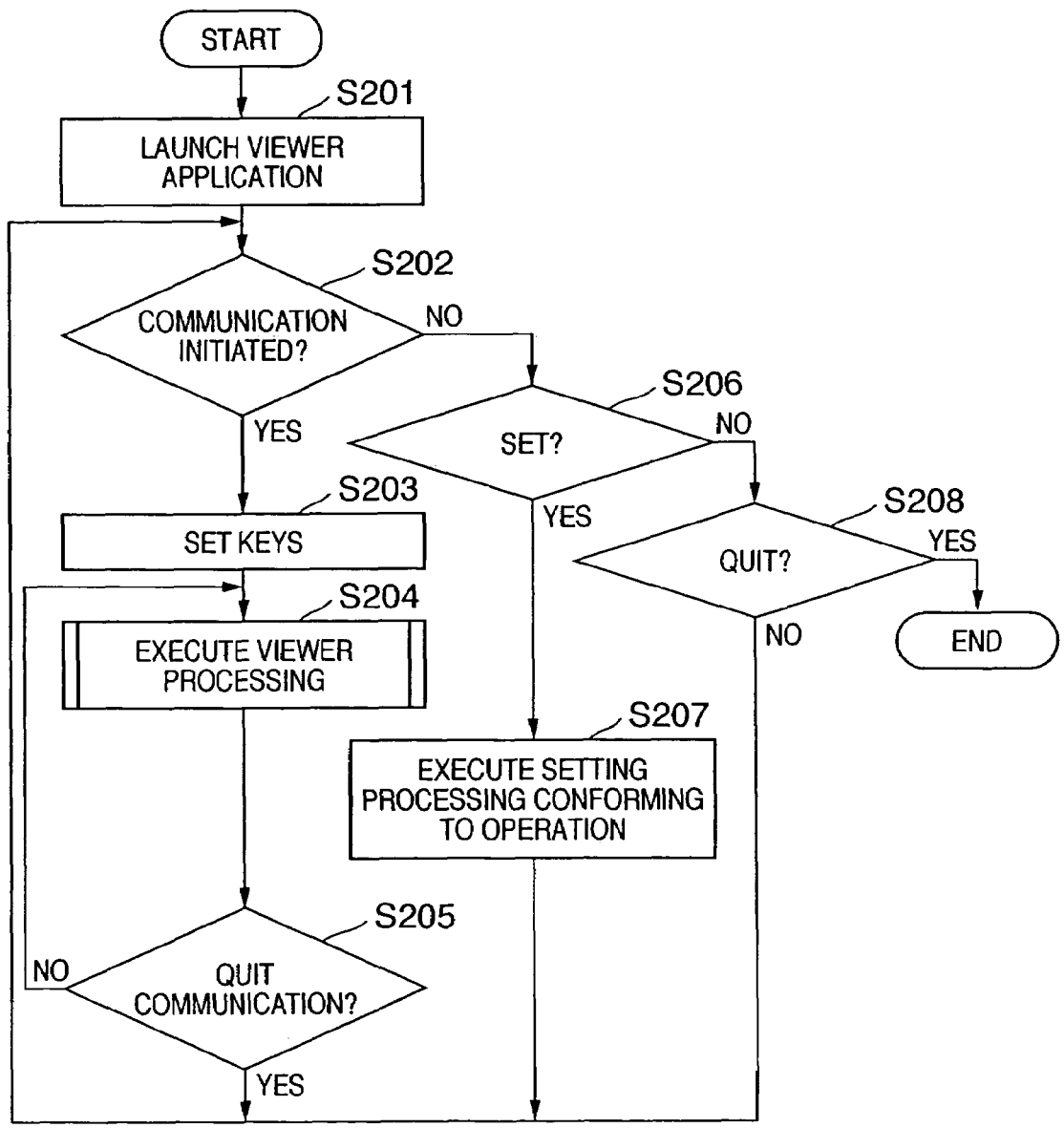
FIG. 6 is a flowchart illustrating processing at launch of the viewer application according to the embodiment of the present invention.

Next, the GUI screen and contents of settings when the setting operation at step S207 in FIG. 6 is performed will be described.

FIG. 7A is a diagram illustrating an example of the GUI screen displayed when the set/stop key 22 is pressed in the GUI screen shown in FIG. 4B. FIG. 8 is a diagram illustrating an explanation of setting items in FIGS. 7A and 7B. The setting functions include a normal-mode setting function and an administrator-mode setting function. FIG. 7A illustrates the GUI screen in the normal mode and FIG. 7B the GUI screen in the administrator mode.

In the case of the normal-mode setting function of FIG. 7A, settings such as backlight illumination of the application screen and operation of the vibrator can be made. Operations of the kind shown in FIG. 15 can be set for the vibrator. For example, assume that the setting is for notification of acquisition of control privilege to be given by the vibrator when the display terminal 12 is waiting for acquisition of control privilege and the camera server 11 is busy. When the control privilege is acquired in such case, the user of the display terminal 12 can be so notified even if the user is not looking at the display. Further, if the vibrator is set to operate when acquisition of an image is completed, the user will be notified of completion of image acquisition when the communication conditions are such that image acquisition will take time. The user of the display terminal 12 can be notified of completion of image acquisition even if the user is not looking at the display, in a manner similar to that described above. Further, the vibrator may be set to operate when there is a communication abnormality or occurrence of an error. The particular cases in which notification by the vibrator should be given can be selected by the vibrator-communication mode setting. The notification by the vibrator may be performed in parallel with or in place of, for instance, the GUI rendering in step S411 in FIG. 10.

Figure 16:
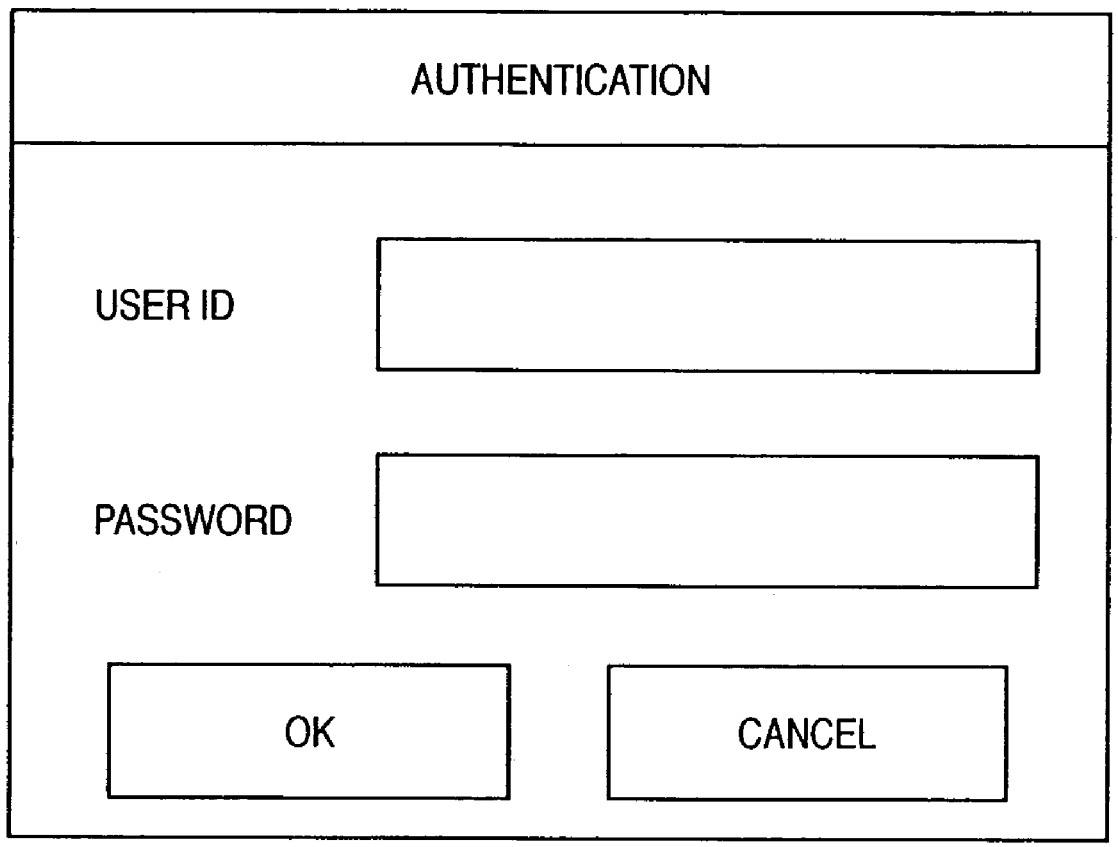
FIG. 16 is a diagram illustrating an example of an authentication dialog screen when a transition is made from the display of FIG. 7A to an administrator screen.

A changeover is made to the administrator screen shown in FIG. 7B by pressing the administrator-mode changeover button. At this time an authentication screen of the kind shown in FIG. 16 requesting a password is displayed before the screen of FIG. 7B is displayed. If authentication is obtained, then the administrator screen of FIG. 7B is displayed.

By pressing an external-device output button, it is possible to perform ON/OFF control of the external devices 14, 15 capable of being driven by outputs at contacts connected to the camera server 11. Further, it is possible to set the transmit video size of the camera server 11 and video quality, which is a parameter when video is compressed.

Described next in simple terms is an instance where ON/OFF control is performed in a situation where a device (a pet feeder) that controls the feeding of a pet is connected as an example of the external device 14 or 15 and a prescribed amount of food is dispensed when the contact output is changed from OFF to ON. For example, in a case where a pet feeder corresponds to a contact 1, the administrator accesses the camera server 11 in the administrator mode and turns on contact 1 in FIG. 7B, whereby the feeder is turned ON. By connecting such a pet feeder to the camera server 11 as the external device 14 or 15 and allowing only the display terminal device connected in the administrator mode to perform ON/OFF control of the external devices 14, 15, a general user cannot feed the pet but the administrator can in a case where the pet is put on public view by the camera.

By thus providing the administrator mode, an operation that is not allowed to be performed by a general user can be performed only by the administrator.

Finally, a scrolling method in a case where the video size is larger than the video display size of the application will be described.

Figure 17A:
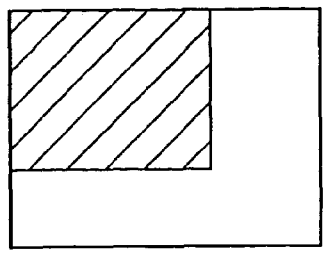
FIGS. 17A to 17I are diagrams illustrating a scrolling operation according to the embodiment of the present invention.
Figure 17B:
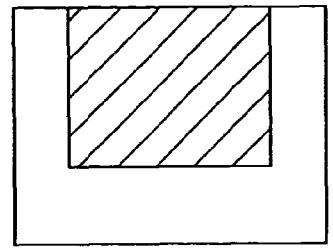
Figure 17C:
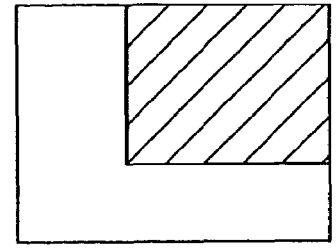
Figure 17D:
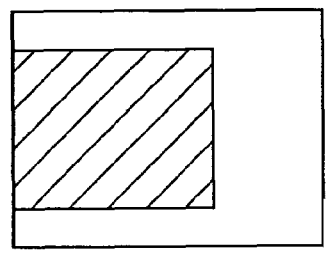
Figure 17E:
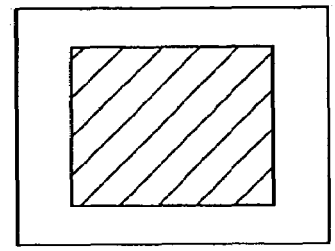
Figure 17F:
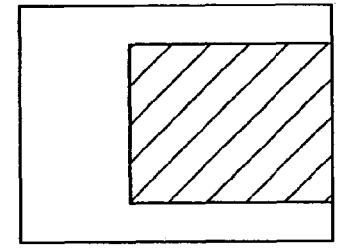
Figure 17G:
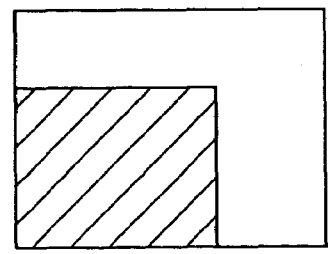
Figure 17H:
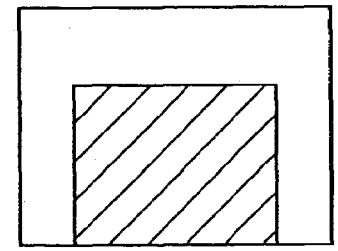
Figure 17I:
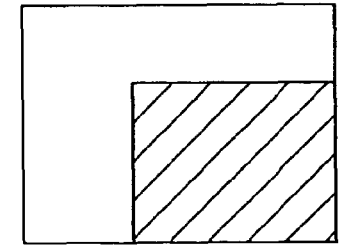

As described above with reference to FIG. 2, the three keys "7", "9", "8" are assigned to scrolling and signify counter-clockwise, clockwise and home. FIGS. 17A to 17I illustrate a scrolling method through which scrolling is performed when these three keys are pressed. The white rectangle represents the overall image, and the shaded portion is an area displayed within the screen. The initial state is the home-position state, in which a partial image at the position indicated in FIG. 17E is displayed. If the clockwise image scroll key 36 is pressed, then rotational scrolling, the reference position of which is the center of the entire image, is performed, i.e., scrolling is performed in the following order: FIG. 17A, FIG. 17B, FIG. 17C, FIG. 17F, FIG. 17I, FIG. 17H, FIG. 17G and FIG. 17D. If the counter-clockwise image scroll key 34 is pressed, scrolling is performed in the opposite direction, i.e., the counter-clockwise direction. Further, if the home-position designating key 35 is clicked, the display becomes as shown in FIG. 17E. This makes it possible to perform full scrolling with a small number of keys.

In accordance with this embodiment as described above, a downloadable viewer application is downloaded to a mobile telephone, thereby making it possible to readily perform remote-camera control in real time while viewing video using a mobile telephone that does not usually have a camera control function.

Further, when the size of an acquired image is larger than the size of the image that can be displayed, the entirety of an image can be displayed by an operation using two or three keys, thereby making it possible to perform scrolling intuitively and in an easily understandable manner using few keys.

In accordance with this embodiment as described above, it is possible to improve operability, at a mobile terminal, of moving-picture control from a camera server and camera control with respect to the camera server.

According to the present invention, a viewer application for displaying camera video and performing a camera control operation is downloaded to and installed in a display terminal such as a mobile telephone via a network, all or part of actual processing is executed by a CPU in the display terminal based upon commands represented by program code of the installed viewer application, and the functions of the above embodiment, inclusive of the operations illustrated by the flowcharts shown in FIGS. 3, 6, 9 and 10, are implemented by such processing. Accordingly, the program code itself implements the functions of the above embodiment and a storage medium storing the program code constitutes the present invention.

Conceivable examples of storage media for storing the program code are a flexible disk, hard disk, ROM, RAM, magnetic tape, non-volatile memory card, CD-ROM, CD-R, DVD, optical disk and magneto-optic (MO) disk. A computer network such as a LAN (Local-Area Network) or WAN (Wide-Area Network) can be used to supply the program code.

As many apparently widely different embodiments of the present invention can be made without departing from the spirit and scope thereof, it is to be understood that the invention is not limited to the specific embodiments thereof except as defined in the appended claims.

What is claimed is:

1. A storage medium, which is capable of being read by an information processing apparatus, storing a program executed in a mobile telephone for the purpose of controlling the mobile telephone, which is capable of communicating with a camera server via a network and has a display unit and a plurality of operating keys, said program comprising: first program code for assigning an operation for camera control to at least one of the plurality of operating keys; and second program code for executing processing for camera control with respect to the camera server in accordance with operation of an operating key of the operating keys, wherein said first program code assigns to a specific key of the operating keys a rotational shifting operation of shifting a portion of video to be displayed in a direction determined on the basis of a position of the portion when the specific key is pressed so as to shift the portion in a clockwise or counterclockwise direction in a case where the video acquired from the camera server cannot all be displayed on the display unit.

2. The storage medium according to claim 1, wherein said first program code assigns at least one operation from among pan, tilt and zoom operations of a camera, which has been connected to the camera server, to the operating keys.

3. The storage medium according to claim 1, wherein said program is downloaded from the camera server to the mobile telephone via the network.

4. A mobile telephone capable of communicating with a camera server via a network, said telephone comprising:
   a display unit;
   a plurality of operating keys; and
   a control unit that assigns an operation for camera control to at least one of said plurality of operating keys, and executes processing for camera control with respect to the camera server in accordance with operation of an operating key of the operating keys,
   wherein said control unit assigns to a specific key of the operating keys a rotational shifting operation of shifting a portion of video to be displayed in a direction determined on the basis of a position of the portion when the specific key is pressed so as to shift the portion in a clockwise or counterclockwise direction in a case where the video acquired from the camera server cannot all be displayed on said display unit.

5. The mobile telephone according to claim 4, wherein said control unit assigns at least one operation from among pan, tilt and zoom operations of a camera, which has been connected to the camera server, to said operating keys.

* * * * *